United States Patent [19]

Pagani

[11] Patent Number: 4,739,813

[45] Date of Patent: Apr. 26, 1988

[54] TUBELESS TIRE VALVE

[75] Inventor: Ezio Pagani, Bergamo, Italy

[73] Assignee: Bridge Products, Inc., Northbrook, Ill.

[21] Appl. No.: 885,377

[22] Filed: Jul. 14, 1986

Related U.S. Application Data

[63] Continuation of Ser. No. 601,223, Apr. 17, 1984, abandoned.

[51] Int. Cl.⁴ ............................................. B60C 23/10
[52] U.S. Cl. ............................. 152/427; 152/DIG. 11; 137/223; 137/231
[58] Field of Search ............... 137/223, 230, 231, 232, 137/233, 234.5; 152/427, 428, 431, DIG. 11

[56] References Cited

U.S. PATENT DOCUMENTS

| | | | |
|---|---|---|---|
| 1,313,554 | 8/1919 | Nielsen | 137/233 |
| 2,033,512 | 3/1976 | Carliss | 137/234.5 |
| 2,106,671 | 1/1938 | Watson | 137/232 |
| 2,240,129 | 4/1941 | Broecker | 137/223 |
| 2,844,183 | 7/1958 | McCord | 152/DIG. 11 |
| 2,966,191 | 12/1960 | Williams | 152/427 |
| 2,968,333 | 1/1961 | Ayres | 152/427 |
| 3,033,263 | 5/1962 | Greco | 152/427 |
| 3,207,172 | 9/1965 | Steer | 137/234.5 |
| 4,275,756 | 6/1981 | Cairns | 137/234.5 |
| 4,425,578 | 10/1984 | Nidle | 152/427 X |
| 4,538,658 | 9/1985 | Earley | 137/234.5 X |

FOREIGN PATENT DOCUMENTS

| | | | |
|---|---|---|---|
| 206271 | 6/1956 | Australia | 137/234.5 |
| 800108 | 9/1950 | Fed. Rep. of Germany | 137/234.5 |
| 2205257 | 6/1973 | Fed. Rep. of Germany | 137/234.5 |
| 180694 | 9/1962 | Sweden | 137/223 |
| 1339756 | 12/1973 | United Kingdom | 137/223 |
| 1376351 | 12/1974 | United Kingdom | 137/223 |

Primary Examiner—Harold W. Weakley
Attorney, Agent, or Firm—Willian Brinks Olds Hofer Gilson & Lione Ltd.

[57] ABSTRACT

A tubeless tire valve has a valve body and an external annular gasket having an internal through hole. The gasket, when not mounted, has a diameter partially lower than the diameter of the cylindrical portion of the valve body, on which it will be inserted, and partially larger than the latter at the coupling area with the rim. Externally, the gasket has at one end an extended lip directed towards the rim, then an intermediate zone having a larger diameter than that of the hole in the rim, and close to the intermediate zone an annular groove of reduced diameter, while a hollowed impression is provided on the valve body at the zone where the rim will be positioned.

5 Claims, 3 Drawing Sheets

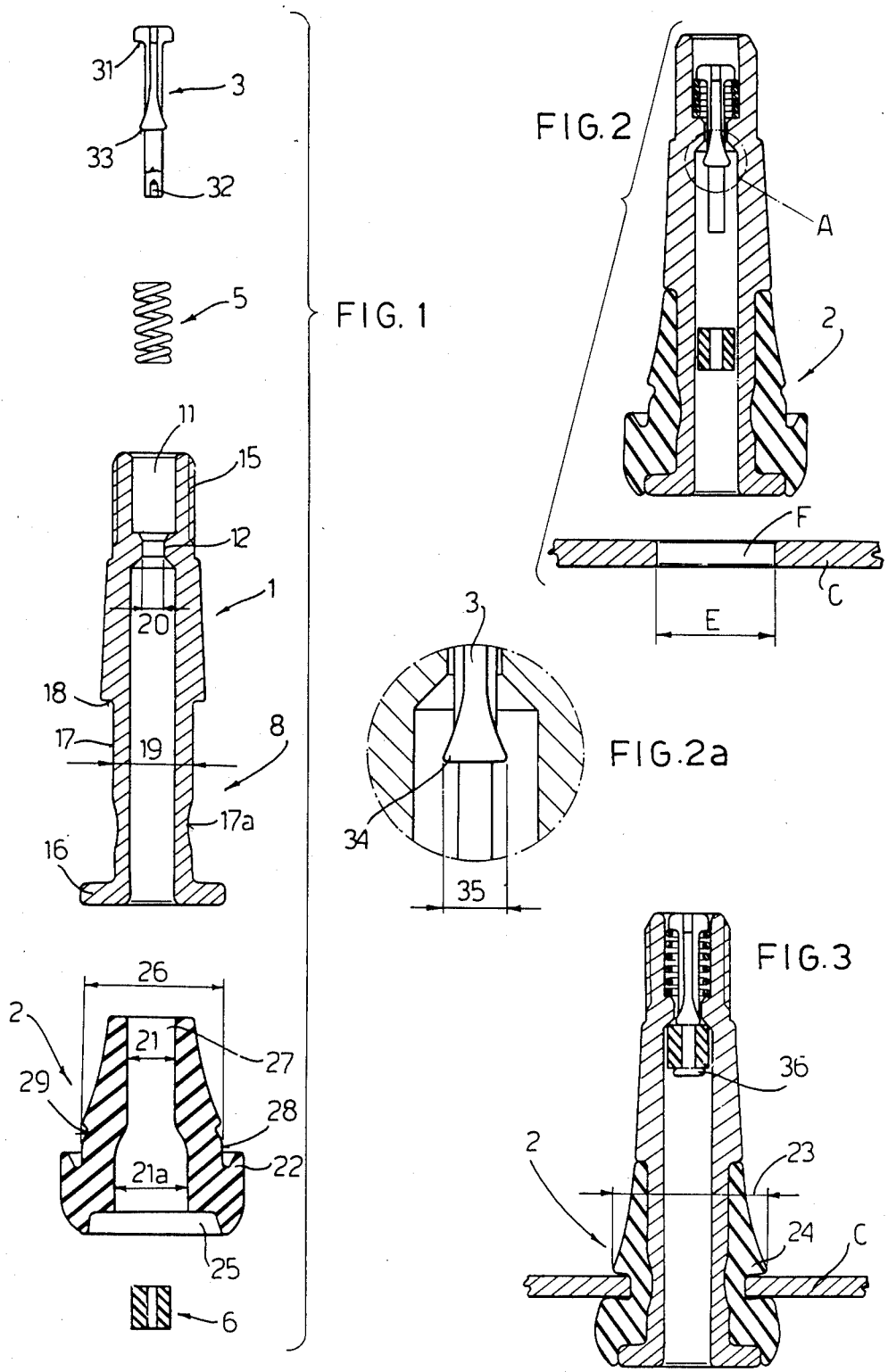

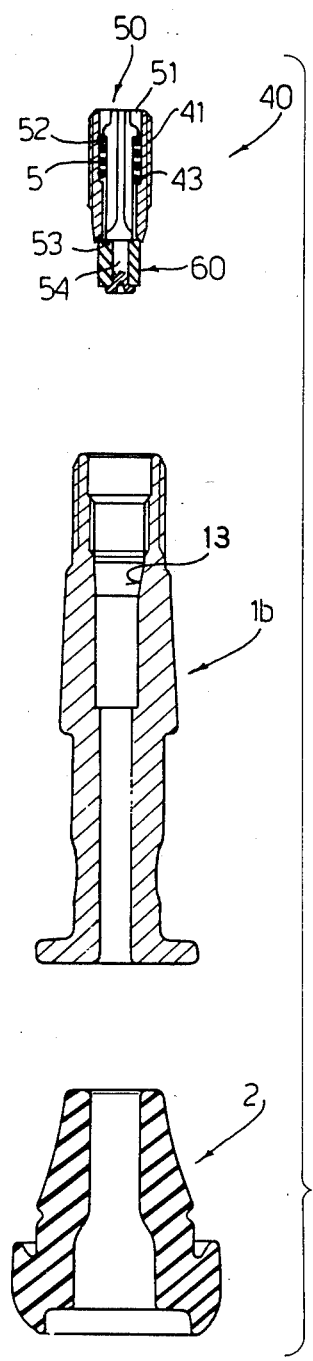
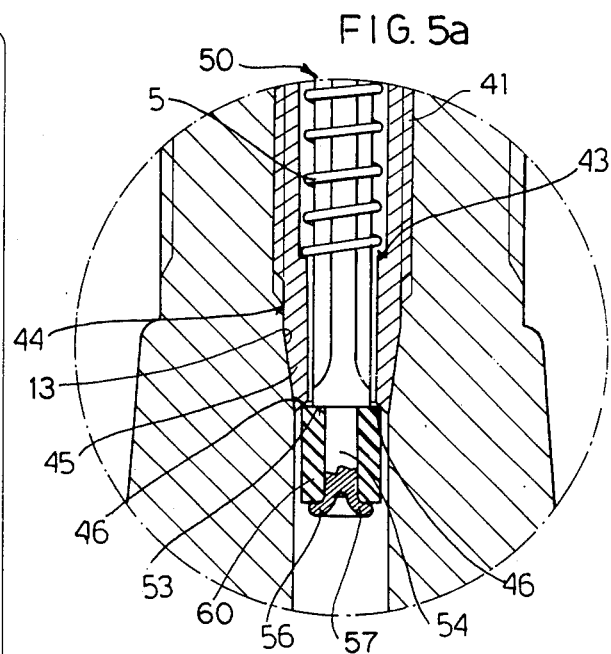
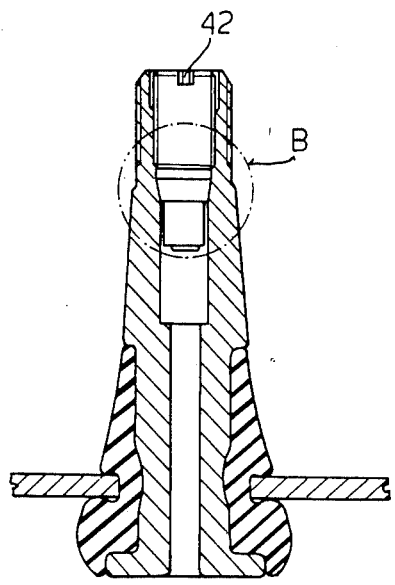
FIG. 4
FIG. 5a
FIG. 5

TUBELESS TIRE VALVE

This application is a continuation of application Ser. No. 601,223, filed Apr. 17, 1984, now abandoned.

This invention relates to a valve provided with an external annular gasket which is employed as a sealing member between the rim and valve body in wheels using tires without tubes, normally referred to as "tubeless".

It is an object of the present invention to provide a valve with its seals, which is highly reliable, very economical and capable of simultaneously allowing a perfect or tight sealing between the rim and valve at any pressure that a tire may be subject to during road transport.

The above mentioned object has been achieved by providing on the valve body an external annular gasket which, when not mounted, has a diameter of the internal through hole partially lower than the diameter of the cylindrical portion of the valve body housing, on which it will be inserted, and partially larger than the latter at the coupling area with the rim, while said gasket externally has at one end an extended lip directed towards the rim, then an intermediate zone having a larger diameter than that of the hole in said rim, and close to said intermediate zone an annular groove of reduced diameter, while a hollowed impression is provided on the valve body at the zone where the rim will be positioned.

This valve may be used together with a mechanism of a conventional type for valve opening and closing, or together with further simplified mechanisms.

One embodiment provides a valve mechanism comprising a pin, a spring and an internal sealing gasket, said pin being provided at one end thereof with a support for the spring and at the other end with a cavity for accomodating said internal sealing gasket of the valve, and in the hole of the valve body a narrowing being provided, so that it can perform the function of both a second support for the spring and a closure seat for the valve cooperating with the internal sealing gasket mounted on said pin.

A further improvement provides that said pin has an enlarged zone with a larger diameter than the narrowing diameter, so that when inserted in the valve body said pin cannot exit therefrom.

Another embodiment provides a valve mechanism comprising three elements: an externally threaded small tube and a pin, both of which are made of plastic material, and a gasket mounted on said pin and disposed to provide the sealing between the pin and a small tube, said small tube being provided at one end thereof with a first tapered portion having such a tapering as to accommodate the tapering of the valve body in which it is to be inserted, and a second tapered portion, furthermost than the former, which has a different tapering than the first tapered portion, such as to interfer with the tapered portion of the valve body whereby the second tapered portion will by deforming during screwing down adhere to the tapered portion of the valve body and seal therewith.

Preferably, this embodiment provides that said end of the small tube carrying on its external surface the above described dual tapering is fitted on its internal portion with a further tapered portion which is used as a seat for the gasket carried by the pin.

Preferably, the pin is made in this case by a spider having a "Y" shape in cross-section.

The plastic for providing both said small tube and pin above described is preferably selected of the type having self-lubricating features.

Finally, the valve may or may not comprise a return spring which prevents ambient air from entering the tube when vacuum has been provided in the latter for control and/or packaging reasons.

This invention will now be further described with reference to some exemplary embodiments as shown in the accompanying drawings, in which:

FIG. 1 is an exploded view of a first embodiment;

FIG. 2 is a view showing the valve of FIG. 1 as partially mounted;

FIG. 2a is a view showing the enlarged detail A of FIG. 2;

FIG. 3 is a view of the valve of FIG. 1 when completely mounted and at closed position;

FIG. 4 is an exploded view showing another embodiment of the valve mechanism;

FIG. 5 is a view of the completely mounted embodiment of FIG. 4;

FIG. 5a is a view showing the enlarged detail B of FIG. 5;

Figures 6, 7, 7A:
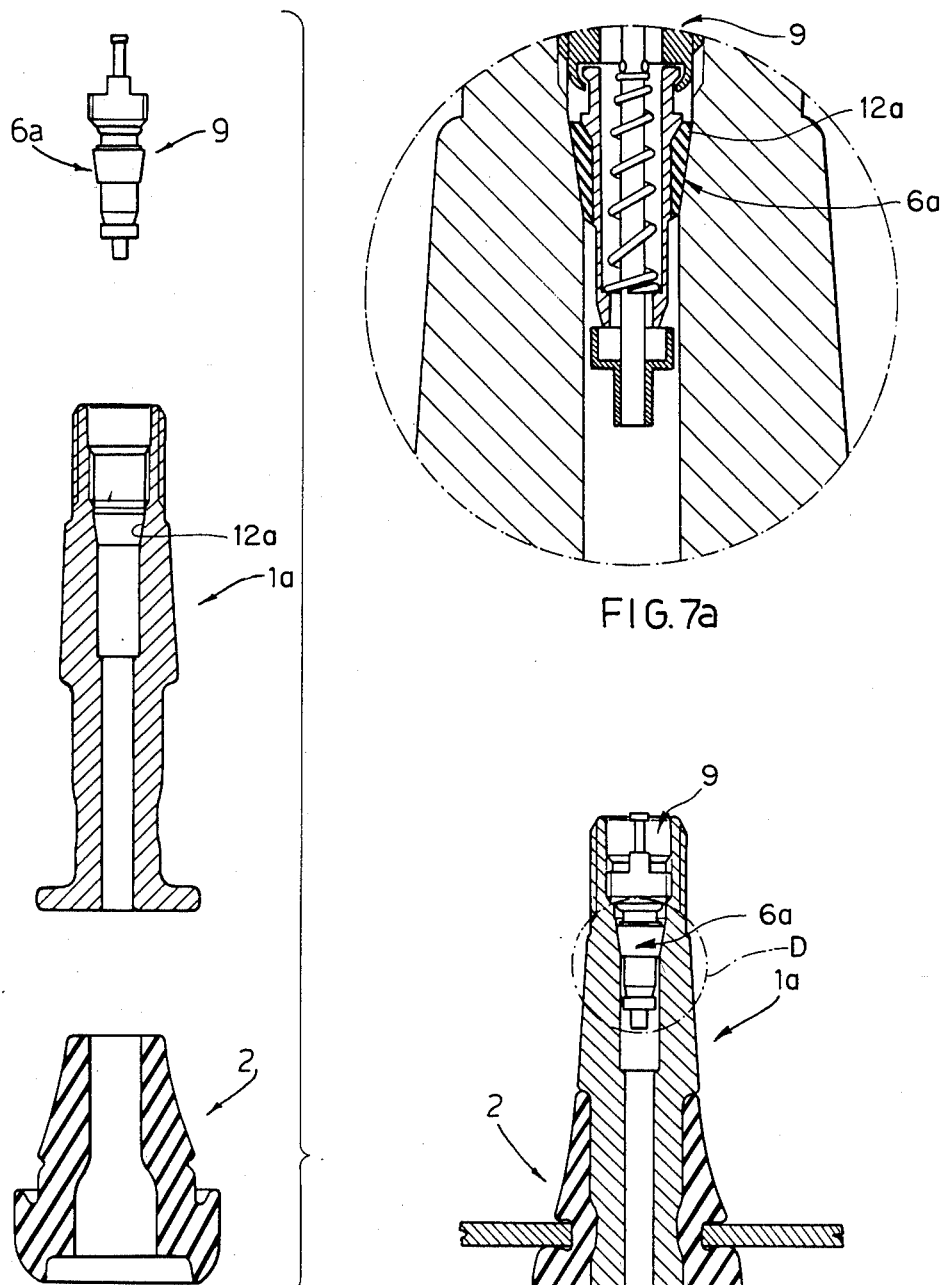
FIG. 6 is an exploded view of a further embodiment.
FIG. 7 is a view of the valve of FIG. 6 as mounted.
FIG. 7a is an enlarged view of the detail D of FIG. 7.

Referring first to FIGS. 1 to 3, it will be seen that reference numeral 2 generally denotes an external gasket with a hole 27 having partly a lower diameter 21 than the diameter 19 of the cylindrical portion 17 of valve body 1 on which said gasket 2 will be inserted. Another portion of said hole 27 has a larger diameter 21a than the diameter 19 of the portion 17 of the valve body 1.

Preferably, said gasket 2 has, at the end which will be inside of the tire, a cavity 25 into which the head 16 of the valve body 1 will penetrate.

Externally, said gasket has at an intermediate zone thereof an external cylindrical portion 28 having a height nearly corresponding to the thickness of the rim C. The diameter 23 26 of this cylindrical portion 28 is larger than the diameter E of the hole F in said rim C.

Adjacent to the cylindrical portion 28 and at that side which will be positioned within the tire, a lip 22 is provided directed towards said rim C, so as to create a better adherence therewith.

Close to its external limit, said cylindrical portion 28 is provided with a groove 29. When the gasket is mounted within the hole F of said rim C, the latter by narrowing the cylindrical portion 28 causes a bulging which provides a second lip 24 (FIG. 3) having such a diameter 23 as to retain said gasket 2 in position when inserted in the rim C.

The valve body 1 has an interior comprising a through hole 11, at an intermediate location of which a narrowing 12 is provided. The outside part of said body, nose or outer side, is conventional, that is it has a threading 15 for receiving a normal cap. The valve head 16, which is provided at the other end of said body 1, will be placed inside of the rim C and will be of a larger size than said hole F. Together with an abutment 18 provided on the external surface of said body 1 and cylindrical portion 17 therebetween, said head 16 provides a housing 8, in which said external gasket 2 is firmly anchored, preventing the tire pressure from ejecting said valve from the hole F of said rim C. Within its cylindrical portion 17, said housing 8 has a hollowed impression 17a arranged at the position to be taken by the rim C.

The valve opening and closing mechanism has been simplified to maximum extent, and consists of only three components, that is the pin 3, the spring 5 and the internal annular gasket 6.

Said pin 3 is so shaped as to have at one end thereof a bearing 31 to act as a seat for said spring 5. At another end thereof, it is provided with an abutment 33 forming together with a hole 32 creating a rivet 36 a seat for receiving and retaining the internal gasket 6. Said pin 3 (FIG. 2a) has also an enlargement 34, which is shaped to have a maximum diameter 35 which is larger than the diameter 20 of the narrowing 12 provided in said valve body 1.

This valve can be assembled as follows:

(1) The external gasket 2 is placed in the housing 8 of the valve body 1 by a nose (not shown) facilitating the gasket sliding into the threaded area 15 of the valve.

(2) The spring 5 is inserted in the hole 11 of the threaded end 15 (nose zone), whereupon said pin 3 is inserted in the spring 5 exerting a slight pressure, which is required in order to overcome the resistance due to the interference existing between the minimum diameter 20 of the narrowing 12 and the diameter 35 of the enlargement 34 forming the collar of said abutment 33.

(3) At the other end of the valve body 1 (head side), the internal gasket 6, which will be secured by the rivet 36, is inserted on said pin 3.

(4) Now the valve can be subjected to sealing test, etc. and to (optional) assembling of the cap which, in addition to ensuring an additional air sealing, has a protective function against weather agent, dust, etc.

The valve is readily and easily mounted in the rim by the usual methods used for "snap-in" type of valves, since it lacks a threaded ring nut (conversely to the "clamp-in" valves). It is not rigidly blocked on the rim, but by bending has the capability of absorbing impacts without being damaged.

Preferably, said body 1 is made of resin, but it may also be made of brass or aluminum.

Alternately the interior of valve 1a can be machined so as to accomodate a conventional mechanism 9 (FIGS. 6, 7 and 7a). In this case, the valve body 1a internally has a conical portion 12a which is such as to receive the also conical internal gasket 6a.

Another embodiment has been shown in FIGS. 4, 5 and 5a. In this case, the valve mechanism comprises a small tube 40, a pin 50 and a gasket 60. The small tube 40 is provided with an external thread 41 extending from one end to a major portion of the whole external surface thereof. This end also has a milling 42 which serves for introducing said small tube 40 into the valve body 1b. Said small tube 40 also has an internal abutment 43 acting as a seat for the head 51 of said pin 50 or spring 5. Adjacent to the end opposite to that carrying said milling 42, the small tube 40 has a first external tapered portion 44 having such a tapering as to accommodate the tapering provided inside of the valve body 1b, as discussed in the following. Adjacent and furthermost with respect to the first tapered portion 44 a second tapered portion 45 is provided, which is of a different tapering to the former and such as to interfere with the tapering 13 of the valve body 1b when said small tube is screwed down within the valve body 1b. The end of the small tube 40 externally carrying the two tapered portions 44 and 45 is internally provided with a further tapered portion 46, serving as a seat for the gasket 60.

The pin 50 is provided with a head 51 forming an abutment 52, which will serve as a seat for the spring 5. Said pin has an elongate body which is of "Y" shape in cross-section. This shape is such as to cause said pin to perfectly uniformly and smoothly slide within the small tube 40. At the opposite end to that carrying the head 51, said pin 50 is provided with a seat for the gasket 60, comprising an abutment 53 and a projection 54 terminating with a hole 57 enabling said gasket to be secured by riveting, obtained by locally deforming said projection 54 to provide the rivet 56.

What I claim is:

1. A valve mounted in a tubeless tire rim comprising:
   a tubeless tire rim having a hole therein;
   a valve body having an enlarged head at one end having an external diameter larger than the diameter of the hole in the rim, wherein said valve body defines a circumferential seat, said valve body further having a longitudinal passageway formed therein;
   a valve means for opening and closing the passageway in the valve body;
   a preformed external gasket inserted on the valve body, said external gasket having an intermediate zone having an external diameter which is larger than that of the hole in the rim, said external gasket having a through hole for receiving the valve body, said through hole of the external gasket comprising a first portion and a second portion, the first portion having an internal diameter which is smaller than the internal diameter of the second portion;
   said valve body seat having a circumferential impression at a position axially corresponding to the position of the rim with respect to the valve body;
   the internal diameter of the first portion of the through hole, when the external gasket is in a preassembled condition with respect to the valve body, is smaller than the external diameter of the valve body portion upon which it will be inserted, while said internal diameter of said second portion of the through hole is larger than the external diameter of the circumferential impression portion of the valve body seat portion at a position corresponding to the position of the rim with respect to the valve.

2. The invention of claim 1 wherein the valve means comprises:
   an internal gasket;
   a pin provided at one end thereof with a first spring support and at the other end with means for mounting the internal gasket to the pin;
   said passageway of the valve body provided with a narrowing that serves as both a second spring support and as a valve seat for the internal gasket mounted on the pin; and
   a spring interposed between the first and second spring supports.

3. The invention of claim 1 wherein the valve body passageway defines an internally threaded region adjacent to a tapered region, and wherein the valve means comprises:
   an externally threaded tube;
   a pin disposed in the tube; and a gasket mounted on the pin to provide a seal between the tube and the pin;

wherein the tube defines at one end a first tapered portion shaped to accommodate the tapered region of the passageway in which the first tapered portion is to be inserted, and a second tapered portion which differs in taper from the first tapered portion to interfere with the tapered region of the passageway such that, when the tube is screwed into the internally threaded region of the passageway, the second tapered portion creates a seal with the tapered portion of the valve body.

4. The invention of claim 2 wherein the pin has a "Y" shape in cross section.

5. The invention of claim 1 wherein the external gasket has an extended lip directed towards the rim.

* * * * *